US005940842A

United States Patent [19]
Sakuta

[11] Patent Number: 5,940,842
[45] Date of Patent: *Aug. 17, 1999

[54] CHARACTER STRING RETRIEVAL SYSTEM HAVING A VARIABLE DISPLAY RANGE

[75] Inventor: Maki Sakuta, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/509,013

[22] Filed: Jul. 31, 1995

[30] Foreign Application Priority Data

Dec. 2, 1994 [JP] Japan .................................. 6-299427

[51] Int. Cl.$^6$ .................................................. G06F 15/00
[52] U.S. Cl. ............................................................ 707/513
[58] Field of Search ...................................... 395/774, 776, 395/788, 792, 793; 707/513, 514, 526, 530, 531, 3, 4

[56] References Cited

U.S. PATENT DOCUMENTS

| | | | |
|---|---|---|---|
| 5,113,341 | 5/1992 | Kozol et al. ............................. | 395/793 |
| 5,133,067 | 7/1992 | Hara et al. ............................... | 395/604 |
| 5,185,698 | 2/1993 | Hesse et al. ............................. | 395/793 |
| 5,220,625 | 6/1993 | Hatakeyama et al. ................... | 395/347 |
| 5,418,946 | 5/1995 | Mori ........................................ | 395/601 |
| 5,523,945 | 6/1996 | Satoh et al. .............................. | 395/759 |
| 5,557,722 | 9/1996 | DeRose et al. .......................... | 395/774 |
| 5,727,195 | 3/1998 | Nakatsuyama ............................ | 707/1 |
| 5,745,745 | 4/1998 | Tada et al. ............................... | 707/1 |

FOREIGN PATENT DOCUMENTS

A-5-324645  12/1993  Japan .

OTHER PUBLICATIONS

Richy, "A hypertext electronic index based on the Grif structured document editor", Electronic Publishing, v. 7, No. 1, pp. 21–34, Mar. 1994.

Mulders, "DRUIDE—Document Retrieval Using Information from Document Elements", Proc. of St. Petersburg Intl. Workshop on Human–Computer Interaction, v. 1, pp. 130–137, Aug. 1992.

Burkowski, "An Algebra for Hierarchically organized text-–dominated databases", Information Processing & Management, v. 28, No. 3, pp. 333–348, Jan. 1992.

Christophides et al., "From Structured Documents to Novel Query Facilities", SIGMOD Record, v. 23, No. 2, pp. 313–324, May 1994.

*Primary Examiner*—Stephen S. Hong
*Attorney, Agent, or Firm*—Staas & Halsey LLP

[57] ABSTRACT

A character string retrieval system is provided which makes it easy to determine whether the character string located by a search performed on a structured document is a desired character string. The system includes character string searching device for performing a full text search on a structured document, structure analyzing device for analyzing the structure of the document, memory device for storing the result of the search performed by the character string searching device and the result of the analysis performed by the structure analyzing device, and display range changing device for changing a display range for displaying text containing a hit character string located during the search, according to structure units analyzed with respect to the document.

3 Claims, 10 Drawing Sheets

| | | ┌─ 30 |
|---|---|---|
| LIST OF SEARCH RESULTS | | |
| NO. | DOCUMENT NAME | LOCATED STRING |
| 0001 | BUN001 | X X X X X <u>a b c d</u> X X X X X X X . |
| 0002 | BUN002 | Y Y Y <u>a b c d</u> Y Y Y Y Y Y Y . |
| 0003 | BUN003 | Z Z Z Z Z Z Z Z Z Z Z Z <u>a b c d</u> |

FIG. 7

CHARACTER STRING RETRIEVAL SYSTEM HAVING A VARIABLE DISPLAY RANGE

BACKGROUND OF THE INVENTION (1) Field of the Invention

The present invention relates to a character string retrieval system, and more particularly, to a character string retrieval system for carrying out a process whereby when a full text search is performed on a structured document, a structure unit to which a hit character string belongs can be interactively displayed.

(2) Description of the Related Art

In recent years, large quantities of documents have come to be electronically processed by means of personal computers or word processors. Electronic documents are associated with a problem that documents produced using different types of machines are often difficult to be converted or reused, but the problem can be solved by employing SGML (Standard Generalized Markup Language) which is internationally agreed upon in respect of document conversion.

A document written in SGML (SGML document) is composed of three parts, that is, SGML declaration, document type definition (DTD), and document instance. The SGML declaration serves to ensure conversion between systems which are in different environments or use different languages, and declares a character system, symbols used in the declaration and definition, and characters used for tag names. The DTD defines the logical structure of elements in a document and the attributes of the elements. The elements are chapters, sections or paragraphs, for example, and the DTD defines the structure of the elements, names of tags (element names), numbers of occurrences of tags, order of occurrence of tags, replacement words, omissibility/non-omissibility of tags, etc. The document instance is an actual document tagged in accordance with the DTD.

When a full text search is performed on a structured document such as an SGML document, the result of the search is generally displayed in methods described below, as in an unstructured document. Namely, (1) a method in which the searcher is informed by means of the number of coincident strings or the names of hit files that the search string exists in documents; (2) a method in which the searcher is informed that the search string exists in a document and also the position at which the search string appears in the document is displayed; and (3) a method in which the searcher is informed that the search string exists in a document and also the position at which the search string appears in the document is displayed, together with specified numbers of characters preceding and following the located character string.

To determine whether the located character string is a character string which the searcher really needs, the context of the character string, for example, must be taken into consideration. With conventional techniques, however, text preceding or following the located character string is not displayed at all, or if displayed, only a specified range is displayed, posing a problem that adequate information necessary for making the determination is not available to the searcher.

SUMMARY OF THE INVENTION

It is an object of the present invention to provide a character string retrieval system which is able to expand a display range including the located character string both forward and backward in interactive mode in accordance with searcher's instructions, particularly to expand the display range according to structure units in the case of a structured document, thereby making it easy for the searcher to determine whether the located character string is a character string which the searcher really needs.

To achieve the above object, the present invention provides a character string retrieval system for displaying the result of a character string search performed on a structured document. The character string retrieval system comprises character string searching means for performing a character string search on a structured document, structure analyzing means for analyzing the structure of the document, memory means for storing the result of the search performed by the character string searching means and the result of the analysis performed by the structure analyzing means, and display range changing means for changing a display range in which a sentence containing a hit character string located during the search is displayed and which is variable according to structure units, in accordance with the search result and the analysis result stored in the memory means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing an example of a screen displaying search results of a plurality of documents in a list form;

DESCRIPTION OF THE PREFERRED EMBODIMENTS

An embodiment according to the present invention will be described with reference to the drawings.

Figure 1:
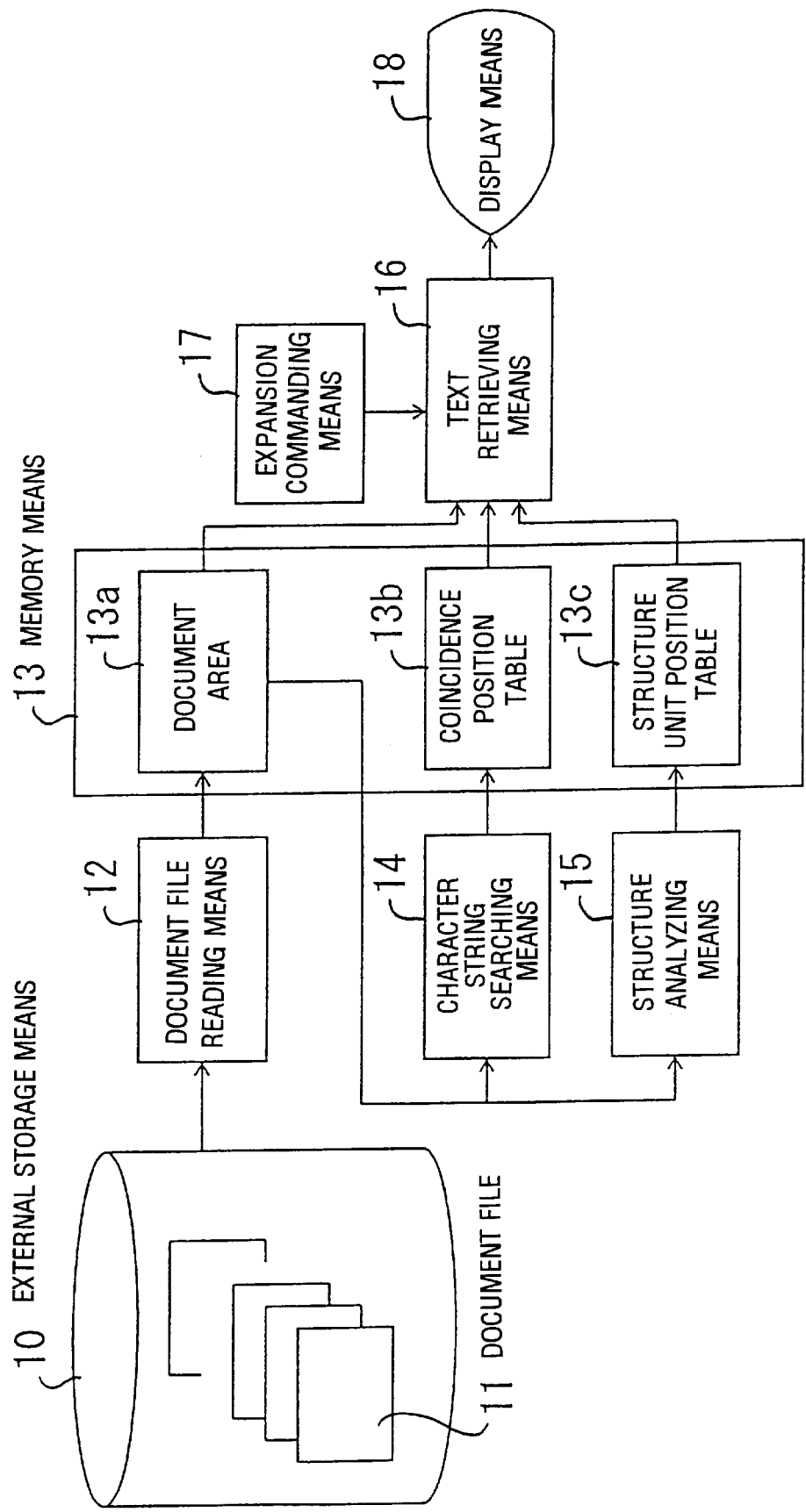
FIG. 1 is a diagram showing the configuration of a character string retrieval system according to the present invention.

FIG. 1 illustrates the configuration of a character string retrieval system according to the present invention. As illustrated in FIG. 1, the character string retrieval system comprises external storage means 10 storing one or more document files 11. Each document file 11 comprises, for example, a document structured according to SGML. The external storage means 10 is connected to document file reading means 12 for reading the document files 11. The output of the document file reading means 12 is connected to memory means 13.

The memory means 13 includes a document area 13a into which text of the document file 11 read by the document file reading means 12 is loaded, and a coincidence position table 13b and a structure unit position table 13c for holding information about the positions of occurrences of search strings and structure units in the document area 13a. The memory means 13 is connected to character string searching means 14 for performing a full text search on the text loaded in the document area 13a and storing the search results in the coincidence position table 13b, and structure analyzing means 15 for analyzing the structure of the text loaded in the document area 13a and storing the analysis results in the structure unit position table 13c. Also, the memory means 13 is connected to text retrieving means 16, which is supplied with the contents of the document area 13a, coincidence position table 13b and structure unit table 13c of the memory means 13 and retrieves text to be displayed according to structure units. To the text retrieving means 16 is connected expansion commanding means 17 for specifying a structure unit according to which text is to be retrieved. The text retrieving means 16 is also connected to display means 18 for displaying the text of the structure unit retrieved by the retrieving means 16.

When the document file 11 is read from the external storage means 10 by the document file reading means 12, the text thereof is loaded into in the document area 13a of the memory means 13. Then, the character string searching means 14 searches the text loaded into the document area 13a for a search string. If a coincident character string is found as a result of the full text search, information about the position of the hit search string in the document area 13a, that is, information representing the start and end positions of the located character string, is stored in the coincidence position table 13b of the memory means 13. The structure analyzing means 15 analyzes the structure of the text loaded into the document area 13a of the memory means 13. In the case where the structured document is an SGML document, the analysis of the document structure is accomplished by examining a DTD defining the logical structure of the document. The information obtained by the analysis and representing the positions of document structure units in the document area 13a, that is, the information about the start and end positions of each structure unit, is stored in the structure unit position table 13c of the memory means 13. This analyzing process by the structure analyzing means 15 is carried out in parallel with or before or after the searching process of the character string searching means 14.

The text retrieving means 16 is started after the read operation of the document file reading means 12, the search operation of the character string searching means 14 and the structure analysis of the structure analyzing means 15 are completed and the document area 13a, coincidence position table 13b and structure unit position table 13c of the memory means 13 are furnished with respective necessary data. At first, a minimum structure unit is set in the text retrieving means 16 as a unit by which text is retrieved from the document area 13a. For example, in the case where the document has a hierarchical structure such that the document is composed of chapters as constituent elements, a chapter is composed of sections as constituent elements, a section is composed of sub-sections as constituent elements, a sub-section is composed of paragraphs as constituent elements, and that a paragraph is composed of sentences as constituent elements, a sentence containing the character string located by the search is retrieved and displayed at the display means 18.

In this case, if an expansion command is given by the expansion commanding means 17, the text retrieving means 16 retrieves a next larger structure unit, that is, in the above example, a paragraph containing the sentence previously retrieved, and the display means 18 displays the thus-retrieved paragraph. Similarly, if an expansion command is thereafter given in succession by the expansion commanding means 17, a sub-section containing the paragraph, a section containing the sub-section, a chapter containing the section, and then the document containing the chapter are retrieved successively in response to respective commands and displayed at the display means 18. By providing the command in this way, it is possible to change a display range containing the character string in question successively from the minimum structure unit to larger ones in accordance with the meaningful hierarchical structure.

Figure 2:
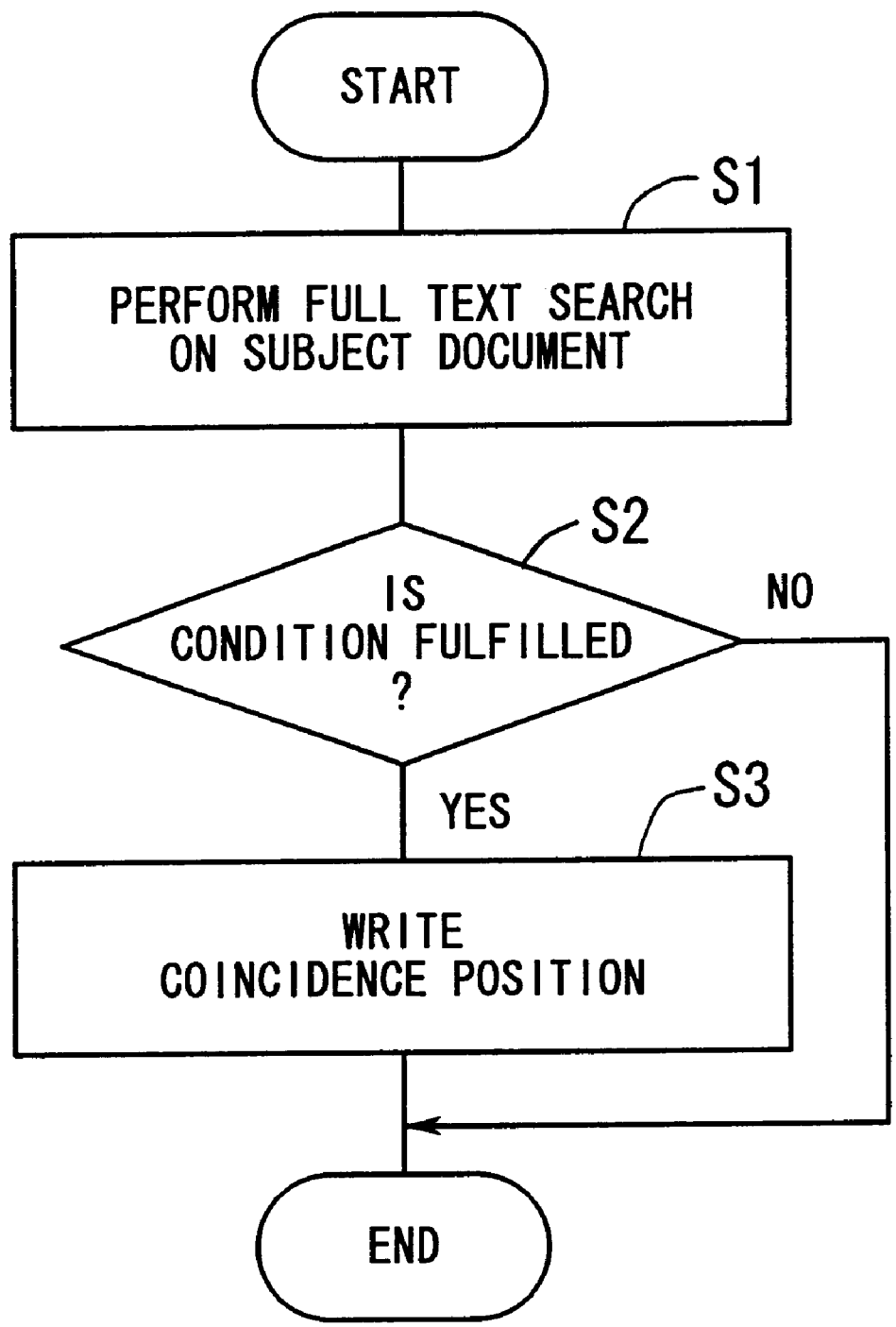
FIG. 2 is a flowchart of a process for carrying out a full text search.

FIG. 2 is a flowchart of a process for carrying out a full text search. As shown in the flowchart, when the full text search is performed, first, the character string searching means 14 searches the text data loaded into the document area 13a for a search string (Step S1). It is then determined whether a search condition is fulfilled (Step S2). The search condition includes a condition for absolute matching with the search string, and an ambiguous search condition based on pattern matching. If it is judged in Step S2 that the search condition is not fulfilled, the process is ended; if the search condition is fulfilled, information about the position of the character string in the document area 13a is written in the coincidence position table 13b (Step S3).

Figure 3:
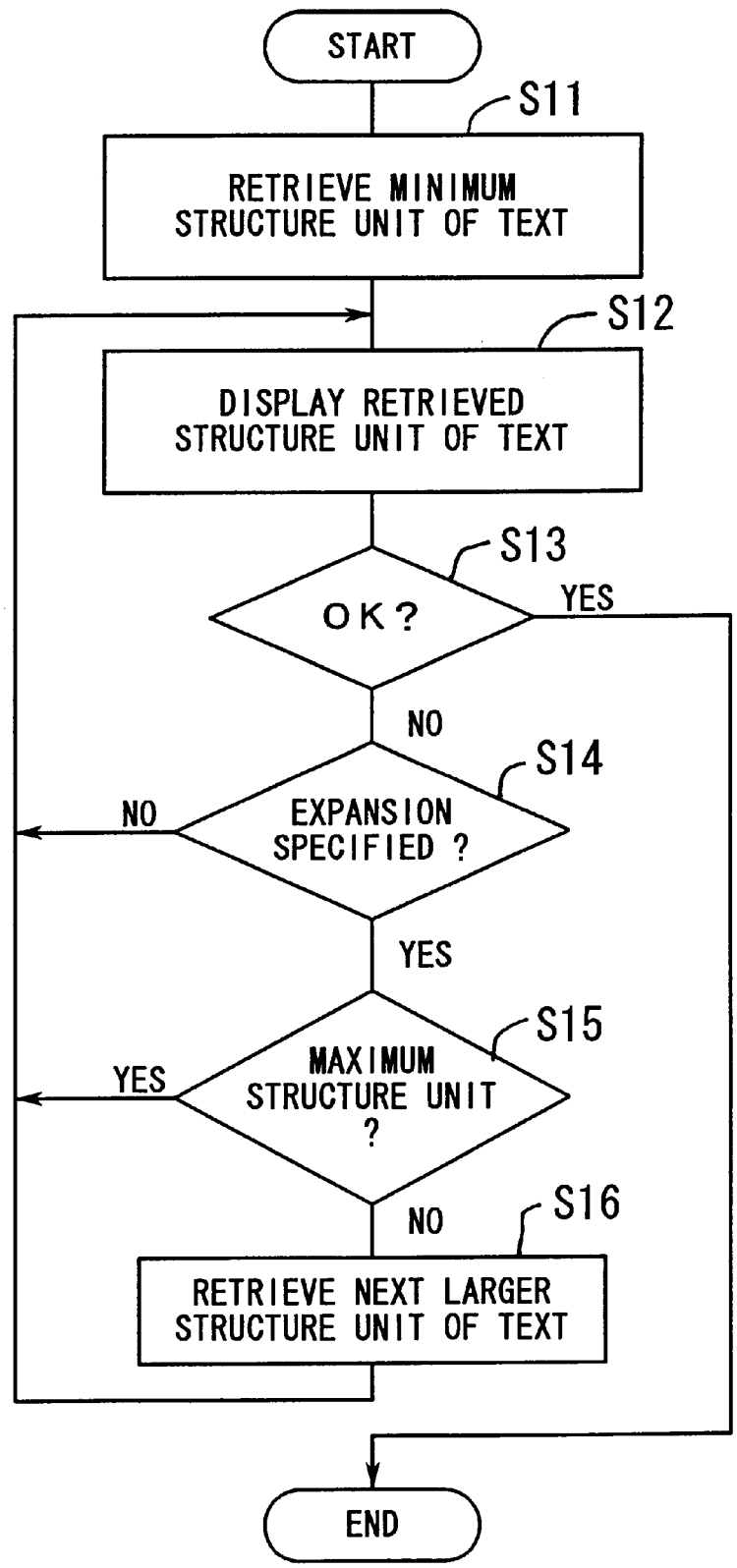
FIG. 3 is a flowchart of a process for retrieving text of a document.

FIG. 3 is a flowchart of a process for retrieving text of a document. As shown in the flowchart, after the analysis of the document structure and the full text search of the document are completed, the minimum structure unit of text containing the string satisfying the condition is retrieved (Step S11). The retrieved structure unit of text is then displayed (Step S12). Subsequently, it is determined whether the currently displayed structure unit is of satisfactory level (Step S13). If the displayed text meets the needs, the process is ended; if reference to a larger structure unit of the hierarchy needs be made, the flow proceeds to the subsequent step. It is then determined whether an expansion command to expand the currently displayed structure unit has been issued (Step S14). If it is judged in Step S14 that no structure unit expansion command is given, the current structure unit is continuously displayed; if a structure unit expansion command is issued, then it is determined whether the currently displayed structure unit is the maximum structure unit which is the highest level in the hierarchical structure (Step S15). If the currently displayed structure unit is the maximum structure unit, no more extensive display is available; therefore, the searcher is notified that the current structure unit is the maximum structure unit, if necessary, and the current structure unit is continuously displayed. If the currently displayed structure unit is not the maximum structure unit, the next larger structure unit of text containing the string satisfying the condition is retrieved (Step S16), and the flow returns to Step S12 to display the retrieved structure unit of text.

Figure 4:
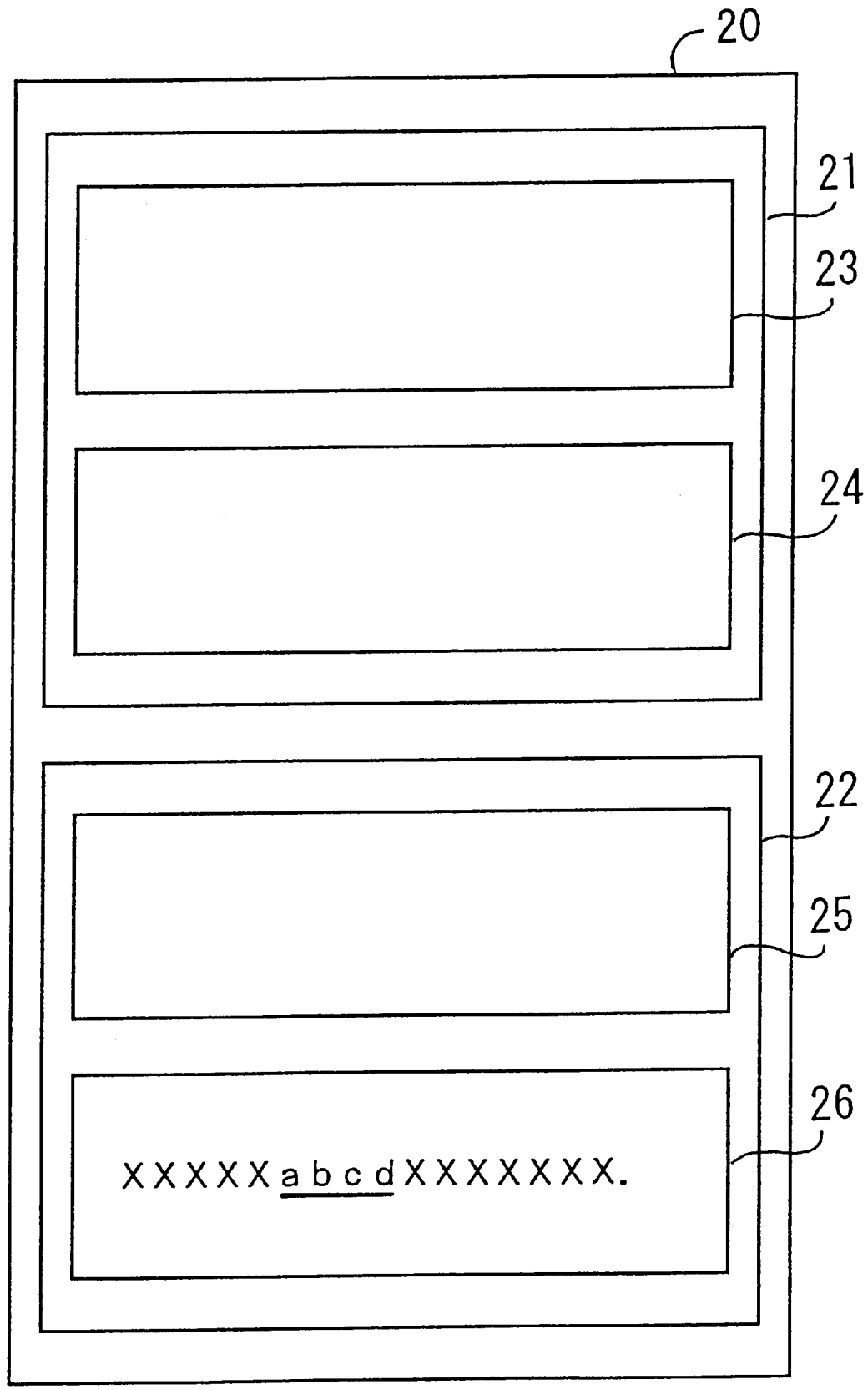
FIG. 4 is a diagram showing an example of a document structure.

FIG. 4 illustrates an example of a document structure. In the illustrated example of document structure, the whole document is indicated at 20. The document 20 is composed of paragraphs 21 and 22 as its constituent elements, and the paragraphs 21 and 22 are composed of sentences 23 and 24 and sentences 25 and 26, respectively, as their constituent elements. It is assumed that the search string "abcd" exists in the sentence 26. When the document is searched for the character string "abcd" and the string "abcd" in the sentence 26 is located, the search result is displayed as described below.

Figure 5:
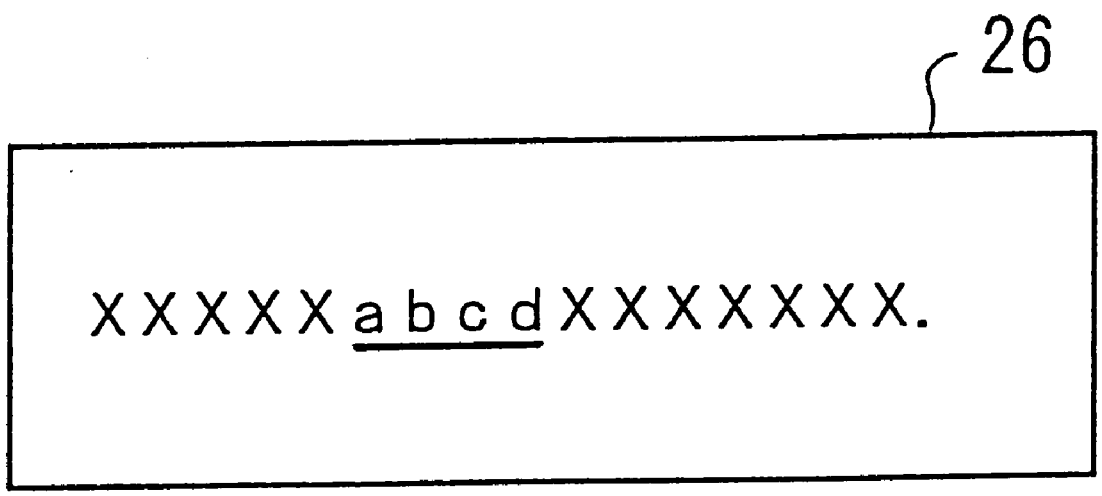
FIG. 5 is a diagram showing an example of a search result screen displayed immediately after a search process.

FIG. 5 illustrates an example of a search result screen displayed immediately after the search process. What is displayed first upon completion of the search process is the sentence 26 which is the minimum structure unit of text containing the hit character string "abcd". The sentence 26 is displayed in a window opened at an appropriate position on the screen, for example. At this time, the character string "abcd" is highlighted in order to indicate that "abcd" is the located character string. In the illustrated example, the hit character string is underlined, but it may be highlighted in any desired manner insofar as the character string stands out against the other text in the same structure unit. For example, the color of the character string or of the background thereof may be changed, or the character string may be shown in halftone.

Figure 6:
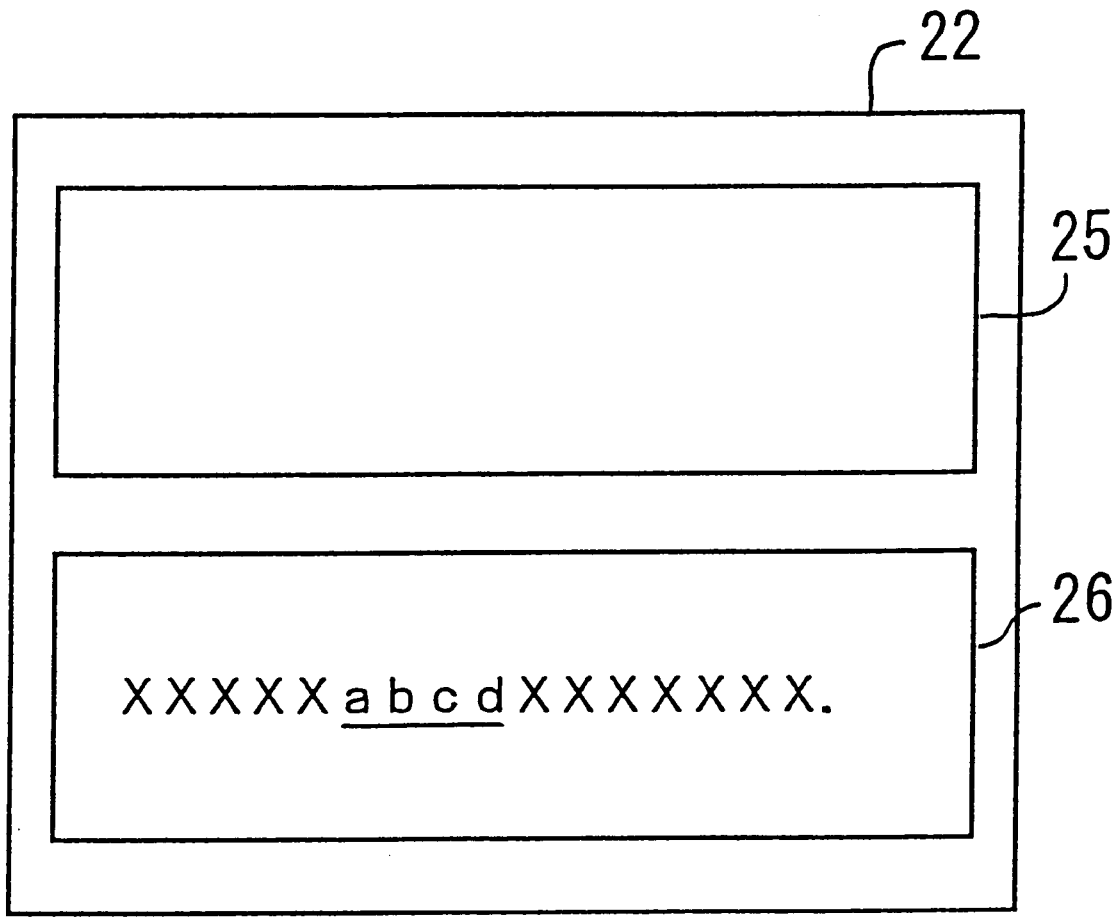
FIG. 6 is a diagram showing an example of a search result screen displayed after view scope expansion command is issued.

FIG. 6 illustrates an example of a search result screen displayed after expansion of the structure unit, or view scope, is commanded. If a view scope expansion command is issued while the sentence 26 containing the character string "abcd" is displayed, the paragraph 22 containing the sentence 26, that is, text of the next higher hierarchical level, is displayed. Since the paragraph 22 contains the two sentences 25 and 26, the sentences are both displayed.

If a view scope expansion command is again issued, the structure unit text of the next higher hierarchical level containing the paragraph 22 is displayed. In the illustrated example, since the next larger structure unit of the paragraph 22 is the document 20, the document 20 shown in FIG. 4 is displayed. In this manner, each time expansion of the view scope is commanded, the object of display, or the character string, is displayed in a larger structure unit.

FIG. 7 illustrates an example of a list showing the results of a search process performed on a plurality of documents. In the case where a search is carried out on a plurality of documents, a list screen 30 showing the search results is displayed on the screen of the display means. The list screen 30 includes a "No." field indicating the order of hit character strings, a "Document Name" field indicating the names of the documents containing the search string, and a "Located String" field showing the minimum structure unit of text containing the hit character string. In cases where the number of hit character strings is large and the character strings do not fit in the list screen 30, the screen is scrolled, thus permitting all of the hit strings to be displayed.

It is here assumed that one document is specified from among those listed on screen and that expansion of the view scope is commanded with respect to the specified document. To provide an expansion command, a document for which expansion is to be specified is selected with the mouse cursor, and then the mouse is double-clicked with the mouse cursor positioned on the selected document or an "Expand" command is selected from a pull-down menu or pop-up menu, for example, which is displayed after the document selection.

Figure 8:
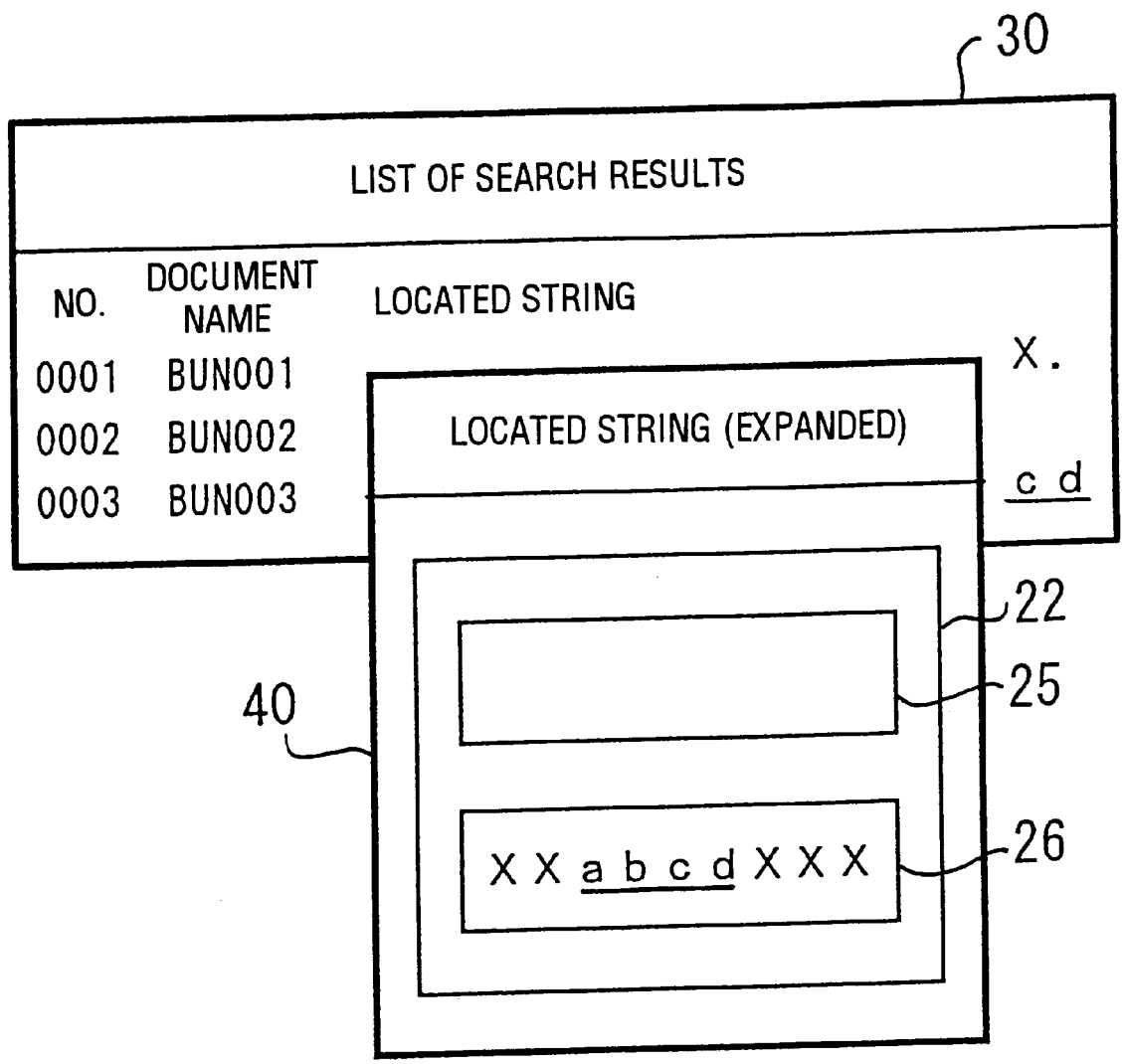
FIG. 8 is a diagram showing an example of a screen displayed after view scope expansion command is given on the search result screen.

FIG. 8 illustrates an example of a screen displayed after the view scope expansion is commanded from the list of search results. In the illustrated example, the view scope expansion command has been issued with respect to the document named "BUN001", for example, and it is assumed that this document has the same document structure as that shown in FIG. 4.

When the view scope expansion command is issued with respect to the document "BUN001" in this manner, an expanded view screen 40 is shown in a window, in which are displayed not only the minimum structure unit containing the located character string, which is also shown in the "Located String" field of the search result list 30, but also text of the next larger structure unit containing the minimum structure unit. Namely, the paragraph 22 containing the sentence 26 as a minimum structure unit, that is, the next higher hierarchical level, is displayed. Since the paragraph 22 contains, in addition to the sentence 26, the sentence 25 as a minimum structure unit, the expanded view screen 40 also shows the sentence 25.

If view scope expansion is further commanded with respect to the currently displayed structure unit, that is, the paragraph 22, the expanded view screen 40 changes as follows.

Figure 9:
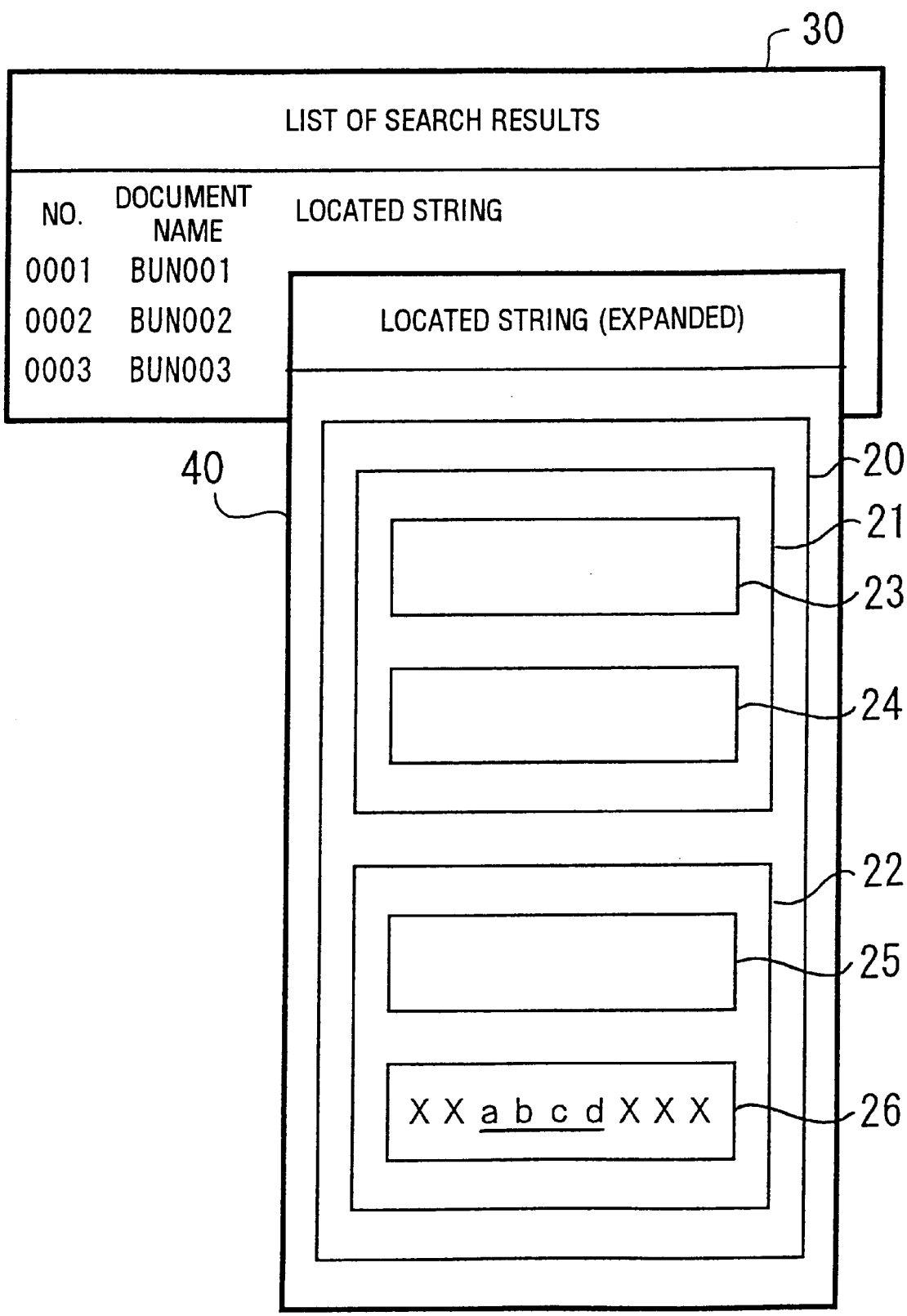
FIG. 9 is a diagram showing an example of a screen displayed after view scope expansion command is given on an expanded view screen.

FIG. 9 illustrates an example of a screen displayed after view scope expansion is commanded from the expanded view screen. Where a view scope expansion command is issued on the view screen shown in FIG. 8, the document containing the paragraph 22, that is, the structure unit of the next higher hierarchical level, is displayed. In the illustrated example, since the next larger structure unit of the paragraph 22 is the document 20, the document 20 shown in FIG. 4 is displayed.

In this manner, each time view scope expansion is commanded, information including the located character string expands such that the character string is surrounded by more and more text, making it easy to determine from the expanded information whether the located character string is situated at a position of interest.

Figure 10:
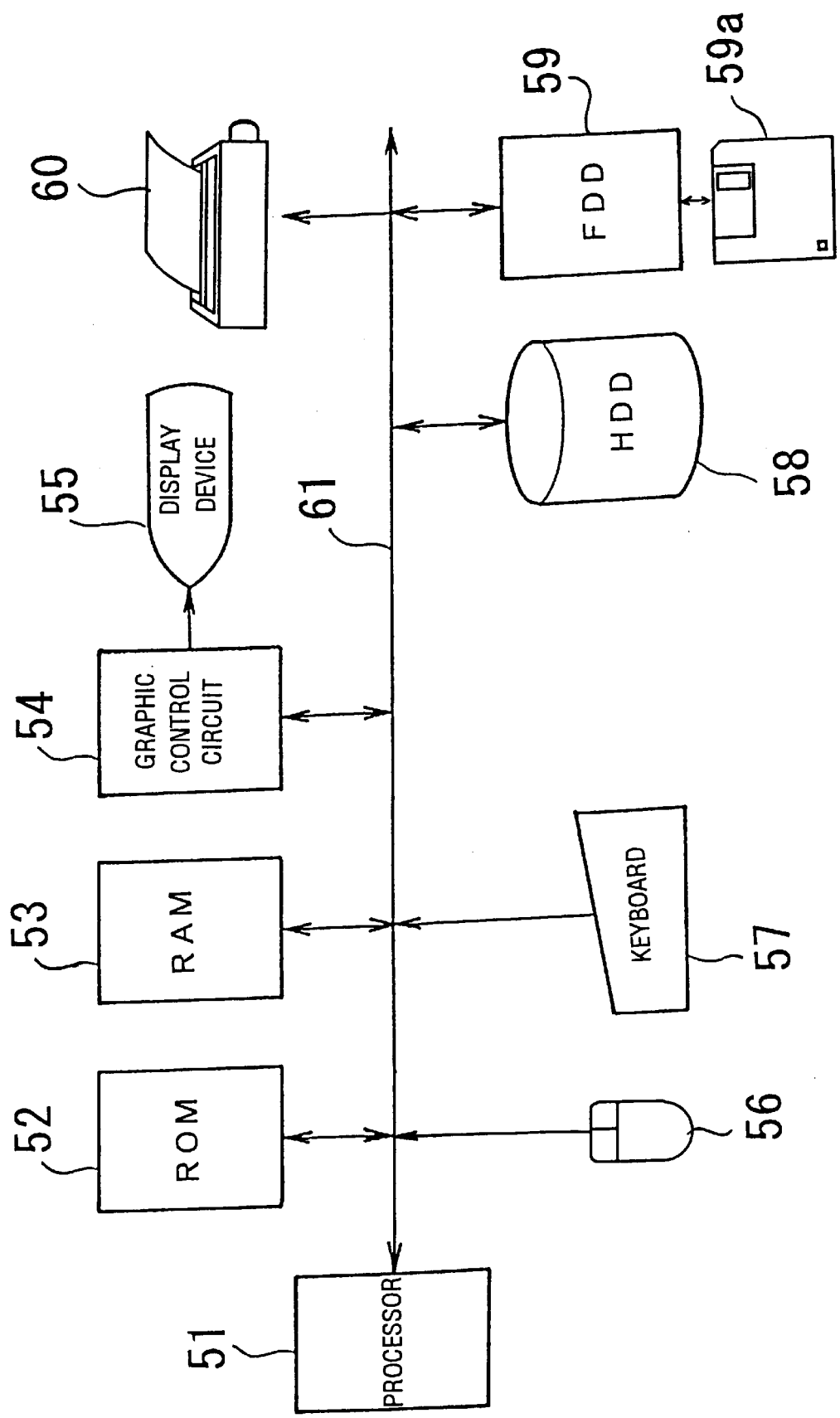
FIG. 10 is a diagram illustrating an example of the hardware configuration of a computer system for carrying out the present invention.

FIG. 10 illustrates an example of the hardware configuration of a computer system for carrying out the present invention. In FIG. 10, the computer system comprises a processor 51, a read-only memory (ROM) 52, a main memory (RAM) 53, a graphic control circuit 54 connected to a display device 55, a mouse 56, a keyboard 57, a hard disk drive (HDD) 58, a floppy disk drive (FDD) 59, and a printer 60, and these elements are interconnected by a bus 61.

The processor 51 globally controls the entire computer system. The read-only memory 52 stores, for example, programs necessary for starting the system. In the main memory 53 are loaded a system program and an application program for character string search, structure analysis and search result display; also the main memory 53 stores text data read from structured documents, data such as the coincidence position table and the structure unit position table, etc.

The graphic control circuit 54 includes a video memory etc., and converts, for example, the search result screen, the list screen showing search results, and the expanded view screen, to display signals, which are then supplied to the display device 55. In accordance with the input display signals, the display device 55 displays the search result screen and the like.

The mouse 56 is a pointing device for moving the mouse cursor displayed on the screen of the display device 55. By clicking a mouse button, it is possible to provide a command to expand the view scope from the list screen showing search results, or to select and specify a command from among those listed in various menus. The keyboard 57 is used to enter a search string etc.

The hard disk drive 58 stores the system program, the application program for full text search, structure analysis and search result display, document files and the like. The floppy disk drive 59 is an external storage device which permits structured document files stored on a floppy disk 59a to be transferred to the hard disk drive 58.

Data representing the list of search results, for example, can be sent to the printer 60 so that the data may be printed on paper.

As described above, according to the present invention, when a full text search is performed on a structured document to search for a character or character string, the minimum structure unit of text containing the search string is displayed, and if necessary, text displayed can be changed from the minimum structure unit such that a next larger structure unit containing the minimum structure unit, that is, a next higher hierarchical level, can be successively displayed. Accordingly, text information can be expanded and displayed in stages by the structure unit such that the minimum structure unit containing the character string is surrounded by more and more text. Thus, peripheral information can be viewed at a glance, making it easy to determine whether the located character string is a desired one and improving the operation efficiency of the full text search.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A character string retrieval system for displaying a result of a search operation for a character string performed on a structured document, the system comprising:

character string searching means for performing a character string search on a structured document;

structure analyzing means for analyzing a structure of the entire structured document;

a coincidence position table for storing a located character string position, representing a position of the character string in the structured document, identified based on the character string search performed by said character string searching means;

a structure unit position table for storing structure unit positions, identified based on the analysis performed by said structure analyzing means, said structure unit positions representing start and end positions of individual structure units constituting the structured document;

text retrieving means for obtaining structure unit positions relevant to the character string using the structure unit position table and the coincidence position table, and for retrieving text corresponding to the obtained structure unit from the structured document; and commanding means for specifying a hierarchical level of the structure units referred by said text retrieving means when obtaining the structure unit positions, wherein when a full text search is performed on a plurality of structured documents, the text retrieving means displays a list indicating names of documents containing located character strings, along with the structure units of text containing the located character strings.

2. The character string retrieval system according to claim 1, wherein the commanding means specifies a structure unit of next higher hierarchical level when one of the structure units displayed on the list of the structure units of text containing the located character strings is selected.

3. A character string retrieval system displaying a result of a search operation for a character string performed on a structured document, the system comprising:

a character string searching routine searching for a character string in a structured document;

a structure analyzing routine analyzing a structure of the structured document;

a coincidence position table storing a located character string position representing a position of the character string in the structured document;

a structure unit position table storing structure unit positions based on the analysis performed by said structure analyzing routine, said structure unit positions representing start and end positions of individual structure units constituting the structured document; and a text retrieving routine obtaining structure unit positions relevant to the character string using the structure unit position table and the coincidence position table, and subsequently retrieving text corresponding to the obtained structure unit from the structured document.

* * * * *